(12) United States Patent
Mian

(10) Patent No.: US 8,188,430 B2
(45) Date of Patent: May 29, 2012

(54) OMNIDIRECTIONAL MONITORING USING NEAR-INFRARED ELECTROMAGNETIC RADIATION

(75) Inventor: Zahid F. Mian, Loudonville, NY (US)

(73) Assignee: International Electronic Machines Corporation, Troy, NY (US)

( * ) Notice: Subject to any disclaimer, the term of this patent is extended or adjusted under 35 U.S.C. 154(b) by 363 days.

(21) Appl. No.: 12/470,518

(22) Filed: May 22, 2009

(65) Prior Publication Data

US 2009/0289187 A1    Nov. 26, 2009

Related U.S. Application Data

(60) Provisional application No. 61/071,863, filed on May 22, 2008.

(51) Int. Cl.
*H01L 31/02* (2006.01)
(52) U.S. Cl. .......................................... 250/330
(58) Field of Classification Search ................... 250/330
See application file for complete search history.

(56) References Cited

U.S. PATENT DOCUMENTS

| | | | |
|---|---|---|---|
| 3,189,744 A * | 6/1965 | Ogland | ............... 398/130 |
| 5,473,474 A | 12/1995 | Powell | |
| 5,760,826 A * | 6/1998 | Nayar | ............... 348/36 |
| 6,507,779 B2 | 1/2003 | Breed et al. | |
| 7,298,548 B2 | 11/2007 | Mian | |
| 7,355,508 B2 | 4/2008 | Mian et al. | |
| 2002/0085271 A1 | 7/2002 | Shafer et al. | |
| 2003/0058112 A1 | 3/2003 | Gleine | |
| 2004/0051782 A1 * | 3/2004 | Bradski | ............... 348/36 |
| 2005/0258943 A1 * | 11/2005 | Mian et al. | ............... 340/426.1 |
| 2006/0033985 A1 * | 2/2006 | Mian | ............... 359/366 |
| 2008/0177507 A1 | 7/2008 | Mian et al. | |

FOREIGN PATENT DOCUMENTS

WO    WO 2006061405 A1 *  6/2006

* cited by examiner

*Primary Examiner* — David Porta
*Assistant Examiner* — Casey Bryant
(74) *Attorney, Agent, or Firm* — Hoffman Warnick LLC

(57) ABSTRACT

A monitoring device includes an imaging device sensitive to visible and near-infrared electromagnetic radiation. The monitoring device is configured to concurrently direct omni-directional visible and near-infrared electromagnetic radiation onto the imaging device without using any moving parts. The monitoring device also can include multiple sources of near-infrared electromagnetic radiation, which can be sequentially operated to illuminate regions of a monitored area to improve the imaged data. The monitoring device can acquire additional data, such as acoustic data or identification data of a target, and can process the acquired data to detect any targets that may be present and evaluate an alarm condition.

20 Claims, 3 Drawing Sheets

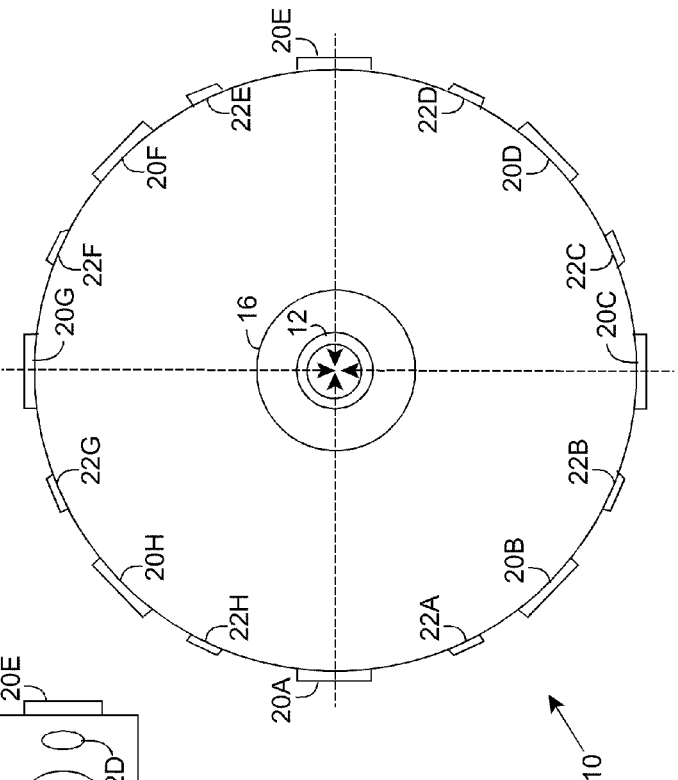
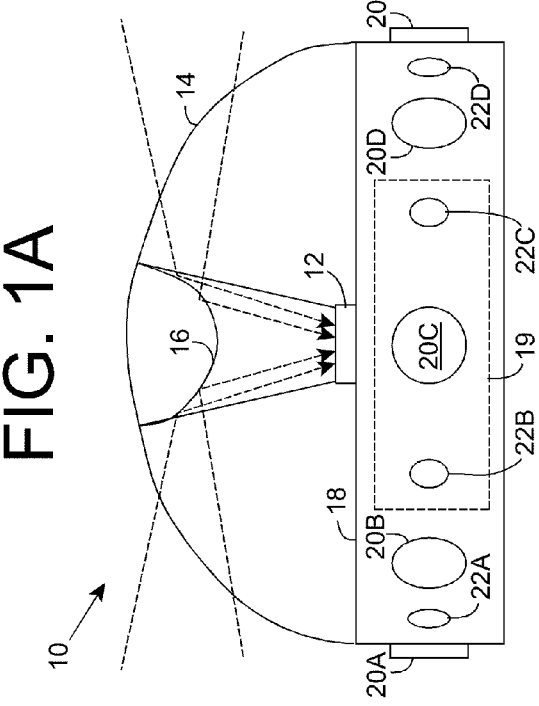

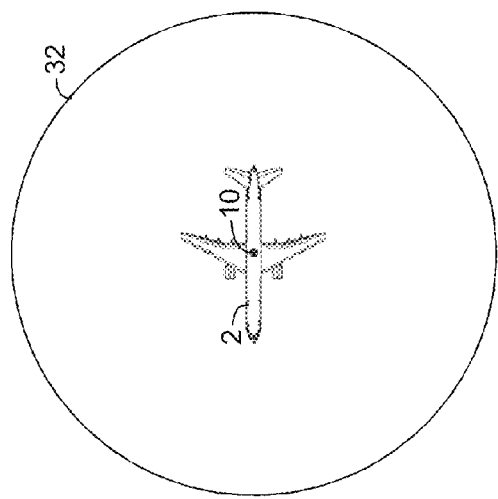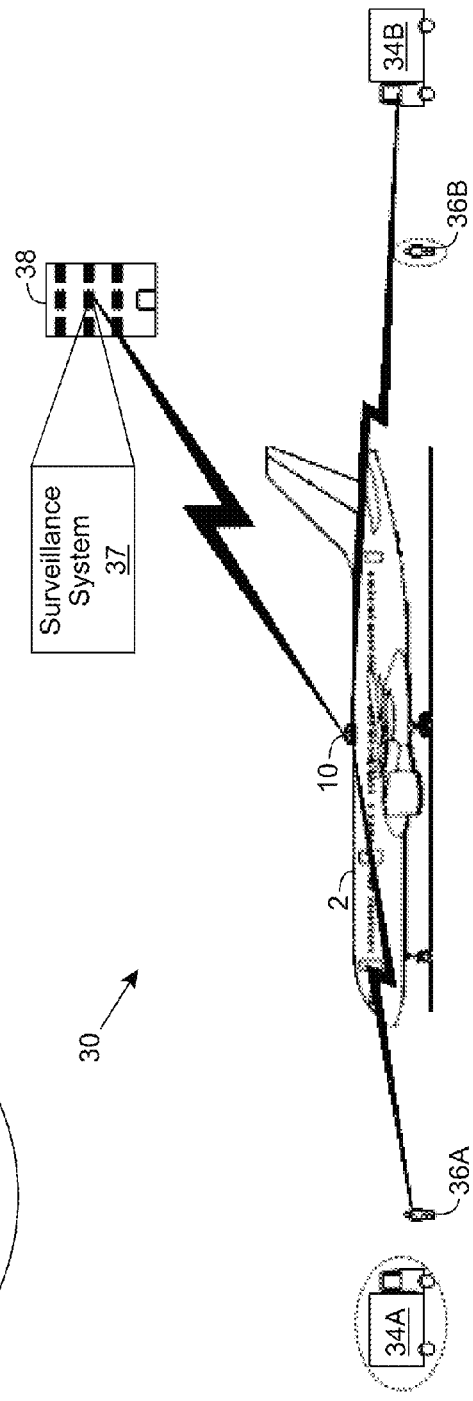

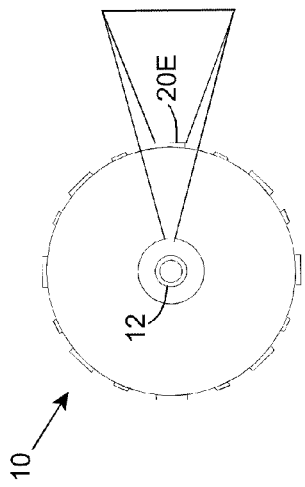
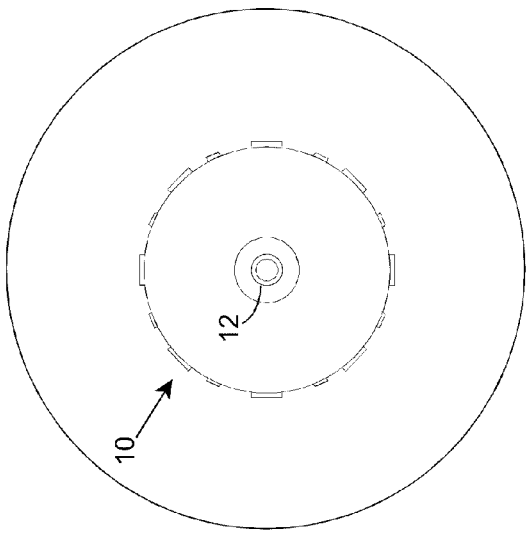
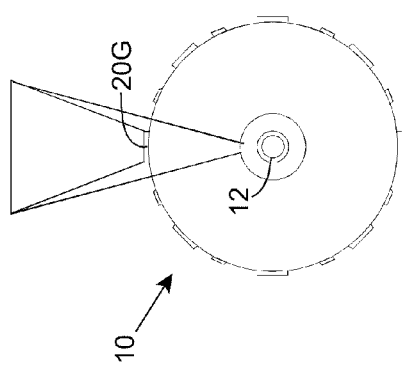
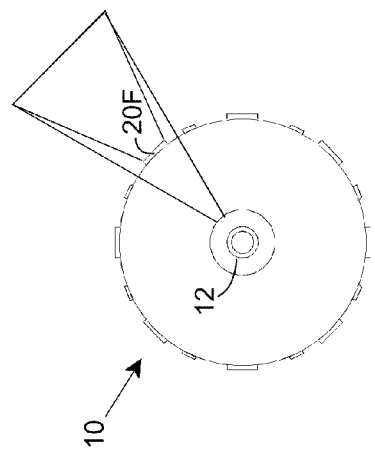

OMNIDIRECTIONAL MONITORING USING NEAR-INFRARED ELECTROMAGNETIC RADIATION

REFERENCE TO PRIOR APPLICATION

The current application claims the benefit of U.S. Provisional Application No. 61/071,863, titled "Low-cost low power low-light surveillance device and system", which was filed on 22 May 2008, and which is hereby incorporated by reference.

GOVERNMENT LICENSE RIGHTS

The U.S. Government has a paid-up license in this invention and the right in limited circumstances to require the patent owner to license others on reasonable terms as provided for by the terms of contract no. NNL05AA22C awarded by the National Aeronautics and Space Administration.

TECHNICAL FIELD

The disclosure relates generally to monitoring an area, and more particularly, to a solution for monitoring an area in every direction and in any lighting condition.

BACKGROUND ART

Unattended vehicles are often targeted by individuals intending to damage, deface, sabotage, steal, steal contents from, and/or the like, the vehicles. Frequently, these individuals target a vehicle parked in a poorly lit area to avoid easy detection. To reduce the threat of being targeted, various locations where vehicles are parked overnight are lighted and/or patrolled by human guards. However, in some locations, adequate illumination and/or patrol is not practical and/or desirable.

For example, cargo and passenger aircraft are often parked on a tarmac that is inadequately illuminated and only lightly patrolled by guards when the aircraft are not in immediate use. Several devices attempt to provide security for various installations, including airports. Currently, systems proposed for constant monitoring of parked aircraft either require very expensive long-wave infrared cameras or high-powered illumination to cover a wide area around the aircraft. Pure visible light-based imaging systems also fail during periods of obscuration (e.g., fog, smoke, or the like). Current systems also generally require either permanent installation and connection to a power supply, temporary wiring to a power supply, or frequent replacement of batteries.

SUMMARY OF THE INVENTION

Aspects of the invention provide a monitoring device that includes an imaging device sensitive to visible and near-infrared electromagnetic radiation. The monitoring device is configured to concurrently direct omnidirectional visible and near-infrared electromagnetic radiation onto the imaging device without using any moving parts. The monitoring device also can include multiple sources of near-infrared electromagnetic radiation, which can be sequentially operated to illuminate regions of a monitored area to improve the imaged data. The monitoring device can acquire additional data, such as acoustic data or identification data of a target, and can process the acquired data to detect any targets that may be present and evaluate an alarm condition.

A first aspect of the invention provides a monitoring device comprising: an imaging device sensitive to visible and near-infrared electromagnetic radiation; means for concurrently directing omnidirectional visible and near-infrared electromagnetic radiation onto the imaging device without using any moving parts; and a plurality of near-infrared illuminators, wherein each near-infrared illuminator is configured to emit near-infrared electromagnetic radiation in a unique region of the area around the monitoring device.

A second aspect of the invention provides a method of monitoring an area, the method comprising: concurrently directing omnidirectional visible and near-infrared electromagnetic radiation onto an imaging device sensitive to the visible and near-infrared electromagnetic radiation without using any moving parts; emitting near-infrared electromagnetic radiation from at least one of a plurality of near-infrared illuminators, wherein each near-infrared illuminator is configured to emit near-infrared electromagnetic radiation in a unique region of the area around the monitoring device, and wherein at least one of the plurality of near-infrared illuminators is off; capturing image data for the area concurrently with the emitting using the imaging device; and processing the image data to detect any target objects present within the area using at least one computing device.

A third aspect of the invention provides a monitoring system comprising: a monitoring device, the monitoring device including: an imaging device sensitive to visible and near-infrared electromagnetic radiation; means for concurrently directing omnidirectional visible and near-infrared electromagnetic radiation onto the imaging device without using any moving parts; and a plurality of near-infrared illuminators located around the imaging device, wherein each near-infrared illuminator is configured to emit near-infrared electromagnetic radiation in a unique region of the area around the monitoring device; and at least one computing device configured to individually operate each of the plurality of near-infrared illuminators and process image data acquired by the imaging device to detect any target objects present within the area.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

FIGS. 1A and 1B show side and top views, respectively, of an illustrative monitoring device according to an embodiment.

FIGS. 2A and 2B show top and side views, respectively, of an illustrative diagram of the operation of a system for monitoring an area around an aircraft using the device of FIGS. 1A and 1B according to an embodiment.

FIGS. 3A-3D show an illustrative method of imaging a panorama using the device of FIGS. 1A and 1B according to an embodiment.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide a monitoring device that includes an imaging device sensitive to visible and near-infrared electromagnetic radiation. The monitoring device is configured to concurrently direct omnidirectional visible and near-infrared electromagnetic radiation onto the imaging device without using any moving parts. The monitoring device also can include multiple sources of near-infrared electromagnetic radiation, which can be sequentially operated to illuminate regions of a monitored area to improve the imaged data. The monitoring device can acquire additional data, such as acoustic data or identification data of a target, and can process the acquired data to detect any targets that may be present and evaluate an alarm condition. As used herein, unless otherwise noted, the term "set" means one or more (i.e., at least one) and the phrase "any solution" means any now known or later developed solution.

Turning to the drawings, FIGS. 1A and 1B show side and top views, respectively, of an illustrative monitoring device 10 according to an embodiment. Device 10 includes an imaging device 12, which is protected from the elements by a substantially transparent weatherproof casing 14. Casing 14 includes an omnidirectional mirror 16 attached thereto, which is configured to direct electromagnetic radiation from all directions about device 10 onto the imaging device 12, thereby providing a full panoramic view of the surrounding area. In particular, mirror 16 is located on a top portion of casing 14, and is directly opposite of and facing imaging device 12. Further, mirror 16 is shaped in a manner that substantially all electromagnetic radiation that impinges mirror 16 is directed toward imaging device 12. In this configuration, imaging device 12 can capture omnidirectional image data of the area surrounding device 10 without using any moving parts.

In an embodiment, imaging device 12 is sensitive to electromagnetic radiation in both the visible and near-infrared spectrums. In this case, casing 14 can comprise any material, e.g., glass, clear plastic, and/or the like, which allows substantially all of the near-infrared and visible electromagnetic radiation to pass there through. Similarly, mirror 16 can comprise any material, e.g., polished metal, glass with a metallic backing, and/or the like, which reflects substantially all of the near-infrared and visible electromagnetic radiation toward imaging device 12. It is understood that casing 14 and mirror 16 are only illustrative of various possible reflective/refractive devices that can be utilized to concurrently redirect electromagnetic radiation from all directions onto the imaging device 12 without using any moving parts. For example, in an embodiment, device 10 can comprise an assembly of flat mirrors configured to provide omnidirectional redirection of electromagnetic radiation, an omnidirectional lens located over imaging device 12, and/or the like.

Imaging device 12 can comprise a sufficiently high resolution that enables determination of desired details of targets of interest within a desired operating range in the omnidirectional image data to enable a desired level of analysis. The level of detail, operating range, and level of analysis can be selected and vary based on the application in which imaging device 12 is used. In an embodiment, imaging device 12 monitors an area for the presence of unauthorized individuals and/or vehicles. In this case, imaging device 12 can have a resolution sufficient to distinguish a human figure/vehicle from an animal/group of animals that are reasonably likely to be present within the area, distinguish types of vehicles that may be present, and/or the like, at the desired operating range for device 10. For example, a two megapixel imaging device 12 can obtain sufficient detail at a range of up to approximately 220 feet to effectively discriminate between human beings and various animals, identify general types of vehicles by profile, and/or the like, which can provide a sufficient level of analysis for a circular area having a diameter of approximately 440 feet.

Use of an imaging device 12 sensitive to both visible and near-infrared electromagnetic radiation provides several advantages over the use of infrared-based imaging devices. For example, images captured by imaging device 12 are at least an order of magnitude greater in resolution than infrared-based images, while imaging device 12 is vastly less expensive than infrared cameras, which can cost tens of thousands of dollars. The higher resolution of imaging device 12 enables the use of panoramic imagery with acceptable levels of detail at acceptable ranges for evaluation. Additionally, visible and near-infrared electromagnetic radiation are passed by standard optical glass materials, while infrared requires exotic and expensive materials for the optics. Further, the panoramic imaging described herein permits the use of a single camera with no moving components to monitor an entire area around device 10.

Imaging device 12 and casing 14 can rest on and/or be removably or permanently attached to a base 18 using any solution. Base 18 can comprise an electronics bay, which contains a processing component 19 for image and data capture, communications, data processing and storage, and/or the like, a power supply (e.g., a battery), and/or the like. Additionally, processing component 19 can include a wireless identification device and/or a module configured to communicate with wireless identification devices, such as active or passive radio frequency identification (RFID) devices. In this case, processing component 19 can acquire identification data for one or more targets within the area surrounding device 10 and/or provide identification data for use by one or more systems within the surrounding area (e.g., to distinguish device 10 from other similar devices deployed in a larger area). Additionally, processing component 19 can be configured to wirelessly communicate with an external computer system, e.g., to transmit an alarm, transmit surveillance data, receive operating instructions, and/or the like.

Processing component 19 can be implemented using any type of computing device(s). For example, processing component 19 can comprise a general purpose computing device with program code executing thereon in order to implement a process described herein. Additionally, processing component 19 can comprise a sensor data processing device implemented using a digital signal processor (DSP) and a field programmable gate array (FPGA) as shown and described in the co-pending U.S. patent application Ser. No. 11/869,981, which is incorporated herein by reference.

Device 10 can further include one or more emitter/sensing devices to acquire additional data used to monitor activity within an area surrounding device 10. To this extent, device 10 is shown including a plurality of illuminators, such as near-infrared illuminators 20A-20H. Each near-infrared illuminator 20A-20H can comprise any type of device capable of emitting near-infrared electromagnetic radiation, e.g., a solid state device such as a light emitting diode (LED), or the like. Each near infrared illuminator 20A-20H can be configured to generate and emit electromagnetic radiation in the near-infrared spectrum in a unique region extending from device 10. In an embodiment, each illuminator 20A-20H emits electromagnetic radiation having a beam angle of approximately sixty or approximately one hundred twenty degrees. Regardless, it is understood that while the region around device 10 that is illuminated by each illuminator 20A-20H can be unique, the various unique regions can overlap.

Additionally, device 10 is shown including a plurality of acoustic sensors 22A-22H. Each acoustic sensor 22A-22H can be configured to detect sound emanating from a source located in a corresponding direction around device 10. Acoustic signals (sound) are not limited by line-of-sight and can be directional and distinctive. Processing component 19 can analyze the acoustic signals received through acoustic sensors 22A-22H and determine a set of attributes of a source of the acoustic signals, such as a direction, a range, a classification (e.g., footsteps, engine, gunshots, etc.), and/or the like. Near-infrared illuminators 20A-20H and/or acoustic sensors 22A-22H can be located and configured such that near-infrared electromagnetic radiation is emitted in and sound can be detected from all directions about device 10.

The various components of device 10 can be powered by a battery that is recharged by a power source, such as a power harvesting device (e.g., a solar panel) of an appropriate size. The power source can be attached directly to device 10 or placed elsewhere with a power connection to convey the power to a battery and/or the various components in device 10. The selection and operation of the various components described with reference to device 10 can be performed to ensure that a power harvesting device provides sufficient power to operate the components 10 for a desired period of time. In an embodiment, device 10 can have an average draw of approximately a few watts during operation, which is supplied by a rechargeable battery. A current-art foldable solar charging assembly of approximately thirty inches on a side can provide up to twenty watts of power in full sunlight and two watts constant in overcast conditions can provide sufficient power to recharge the battery in many climate areas. By increasing a size of the solar charging assembly to approximately forty-two inches on a side, still a relatively compact size for monitoring a large area (e.g., having a radius of approximately 220 feet), an amount of power provided by the solar charging assembly can be doubled.

Device 10 is capable of acquiring omnidirectional image data for an area regardless of the presence of external/ambient lighting (e.g., both day and night lighting conditions). To this extent, device 10 can be utilized in locations where lighting conditions cannot be assured without the need for high-powered floodlights, expensive infrared cameras, or other expensive panoramic surveillance systems. In an illustrative application, device 10 can be deployed to monitor an area for potential threats, such as approaching vehicles/individuals. For example, device 10 can monitor an area where a set of vehicles is/are parked for a period of time to determine whether any persons intending to damage, deface, sabotage, steal, steal contents from, and/or the like, the vehicle(s). Device 10 can be located within the area in such a manner to provide a relatively unobstructed view of the surrounding area in substantially all directions around device 10. Further, if necessary, multiple devices 10 can be deployed to monitor an area, e.g., due to the size of an area, obstructions within the area, and/or the like.

In a particular embodiment, device 10 is utilized to monitor an area around one or more parked aircraft at an airport. FIGS. 2A and 2B show top and side views, respectively, of an illustrative diagram of the operation of a system 30 for monitoring an area 32 around an aircraft 2 using device 10 (FIGS. 1A, 1B) according to an embodiment. In this case, system 30 includes a device 10, which is temporarily placed atop an aircraft 2 using any solution. For example, device 10 can comprise a magnetic underside that will adhere to metallic structural components of aircraft 2. Further, device 10 can be attached using one or more suction devices, such as those used to attach various electronic devices to car windows, dashboards, and/or the like. Placement of device 10 atop aircraft 2 provides device 10 with a good field of view of the surrounding area without requiring construction of any permanent or temporary support structures (e.g., a pole). However, it is understood that device 10 can be located in any of various locations, e.g., below aircraft 2 on the ground, a stand, or the like. Device 10 can be configured to acquire image data having sufficient resolution to enable system 30 to sense and discern any targets of interest within an area 32. In an embodiment, area 32 comprises a radius of approximately two hundred feet, although device 10 can be configured to enable targets of interest to be sensed at any of various ranges. In this case, depending on the relative size of the targets of interest, device 10 can comprise a resolution between approximately one megapixels (e.g., to detect vehicle-sized moving objects) to six megapixels (e.g., to distinguish a human from a large animal) or even higher.

During operation, device 10 acquires near infrared and/or visible light-based image data and/or other data, such as acoustic data, from all directions around device 10. Various objects may move in and out of area 32 while device 10 is monitoring the area 32. For example, two vehicles 34A, 34B and two humans 36A, 36B are shown within area 32. Device 10 can acquire image data, which enables detection of and discrimination between the various targets 34A, 34B, 36A, 36B within area 32 during any lighting/visibility conditions.

Processing component 19 (FIG. 1) of device 10 can process the image data to detect the presence of one or more targets in the area 32. A target can comprise any type of object moving within the area 32. Processing component 19 can identify a type of the target in the area 32 and/or processing component 19 can communicate the image data and/or data corresponding to the identified target to a surveillance system 37, which can be locally or remotely located (e.g., within a building 38). For example, processing component 19 can remove distortion in the image data introduced by the panoramic optics. Processing component 19 also can track a target as it moves within the area 32 using any solution.

When a target is sufficiently close, processing component 19 and/or surveillance system 37 can perform other analyses of approaching targets 34A, 34B, 36A, 36B. For example, for humans 36A, 36B, processing component 19 and/or surveillance system 37 can implement an algorithm to compare various biometric information, such as facial features, manner of walking, and/or the like, with biometric recognition patterns of known individuals stored in a database in order to identify the humans 36A, 36B. Similarly, for vehicles 34A, 34B, processing component 19 and/or surveillance system 37 can process the image data to identify a vehicle type, acquire vehicle identification information, such as a license plate number, and/or the like. Surveillance system 37 can be implemented using any type of computing device(s), which is configured to present data (e.g., alerts, sensor-based data, and/or the like) received from device 10 to a user (e.g., security personnel within building 38), initiate one or more actions in response thereto, and/or the like. In an embodiment, surveillance system 37 comprises a general purpose computing device executing a program to implement a set of actions described herein.

Additionally, device 10 can acquire identification data from one or more wireless identification devices included on a target 34A, 34B, 36A, 36B within area 32. For example, personnel and/or vehicles authorized to enter area 32 can include a wireless identification device that can transmit an identification of the corresponding individual/vehicle to device 10, e.g., in response to a query/request from processing component 19. Processing component 19 can use the identification data to further evaluate a detected target 34A, 34B, 36A, 36B, e.g., to discriminate between personnel and/or vehicles that are and are not permitted to approach aircraft 2. Further, one or more components of an object, such as a parked aircraft 2, located within area 32 can comprise a wireless sensing device with which device 10 can communicate. For example, one or more components of aircraft 2 that are not within the line of sight of device 10 (e.g., doors, windows, ramps, etc.) can include a wireless sensing device, which is configured to communicate with device 10 when tampered with, moved, or the like. Device 10 also can acquire acoustic data and/or other types of sensory data, which can be analyzed to further identify a target 34A, 34B, 36A, 36B.

In any event, processing component 19 can evaluate the sensed data acquired while monitoring area 32 and perform any actions, if necessary, in response to the evaluation. For example, device 10 may detect targets 34A, 34B, 36A, 36B within area 32, and obtain valid identification data from vehicle 34A and person 36B, but not receive any identification data (or invalid/unrecognized identification data) from vehicle 34B or person 36A. Processing component 19 can transmit an alert for processing by surveillance system 37 in response to the detection of vehicle 34B or person 36A, and transmit a notification, or take no action, in response to the detection of vehicle 34A or person 36B. In either case, processing component 19 also can transmit some or all of the processed and/or raw sensor data (e.g., image data, audio data, identification data) used to identify the alert or notification. Subsequently, the surveillance system 37 can initiate any further action(s), if necessary, which can include altering the operation of device 10, e.g., to focus on a particular region within area 32, continually send sensor data for a period of time, and/or the like. Additionally, processing component 19 and/or the surveillance system 37 can perform time-based evaluation of the various sensor data, including determination of a sequence of events, current conditions, or the like, enabling the system 30 to make a judgment about what is occurring within the area and determine what action(s), if any, should be taken.

As discussed herein, device 10 can be configured to monitor area 32 while requiring a substantially reduced amount of power. In particular, a major power requirement for a visible light-based monitoring system to be used day and night is the need for illumination. For example, to produce usable levels of visible light illumination in a radius of one hundred feet or more requires many tens of watts. Additionally, visible light draws attention to the monitored area and/or monitoring device 10.

In contrast, near-infrared illuminators consume much less power, e.g., approximately six watts for a powerful illuminator covering nearly one hundred twenty degrees, and can be duty-cycled at a high speed with rise times in the range of a few microseconds. As a result, near-infrared illuminators can be actually "on" for only a very small proportion of the time while providing more than sufficient illumination for many monitoring applications. Near-infrared electromagnetic radiation is also invisible to the naked eye, thereby avoiding drawing attention to the monitored area and/or monitoring device 10.

In this manner, device 10 can be successfully powered using a locally deployed power harvesting device. For example, by acquiring image data based on near-infrared electromagnetic radiation, device 10 does not require the use of panoramic lighting in the visible light range. Additionally, when sufficient external/ambient lighting conditions are present (e.g., during daylight hours), device 10 can acquire image data without the use of illuminators 20A-20H (FIG. 1). Further, when utilized, processing component 19 can operate the various near-infrared illuminators 20A-20H in a manner that provides a panoramic view several times per second while using only a fraction of the energy needed to illuminate the entire panorama.

FIGS. 3A-3D show an illustrative method of imaging a panorama using device 10 according to an embodiment. When device 10 is operating, imaging device 12 views the entire panorama at a particular frame rate. However, without illumination (e.g., in darkness) in a region, imaging device 12 will not capture any image data for the region. In an illustrative mode of operation, processing component 19 (FIG. 1) sequentially activates and shuts down near-infrared illuminators, such as illuminators 20E, 20F, and 20G, with only one illuminator being active at any point in time. The illuminators can be sequentially activated (turned on) and shut down (turned off) in synchronization with the frame rate of imaging device 12 such that an illuminator is active for only one sequential frame captured by imaging device 12, and each sequential frame captured by imaging device 12 will have an illuminator active. In an embodiment, each illuminator is activated for approximately 10-20 microseconds. To this extent, in FIG. 3A, illuminator 20G is active during a first frame capture by imaging device 12; in FIG. 3B, illuminator 20F is active during a second frame capture by imaging device 12; and in FIG. 3C, illuminator 20E is active during a third frame capture by imaging device 12. As illustrated in FIG. 3D, after eight frame captures by imaging device 12, the entire panorama around imaging device 12 has been imaged and the sequence can be repeated.

Processing component 19 can continue and repeat the sequential operation of the illuminators in synchronization with the frame captures by imaging device 12. The sequential scanning operation of device 10 produces a similar effect of a scanning monitoring camera with no moving components and a low power demand. Processing component 19 can assemble the image data of the individual illuminated sections after a complete sequence (e.g., one image for each illuminator) into a full panorama image using standard image processing techniques. In an embodiment, for an imaging device 12 having a frame capture rate of sixty frames per second and having eight near-infrared illuminators sequentially operated, an effective panoramic frame rate of 7.5 per second can be attained. However, it is understood that any number of illuminators and any frame rate can be utilized. Further, it is understood that processing component 19 can activate the various illuminators in any order. Still further, operation of the illuminators can be controlled directly/altered by the surveillance system 37 or a user thereof if desired, e.g., to focus attention on a particular region of the panoramic area.

As shown and described herein, device 10 can be attached to or located near a parked aircraft as part of a security monitoring system 30 (FIG. 2). However, it is understood that device 10 can be utilized in various alternative applications. For example, a portable version of device 10, which includes a solar array (or other power harvesting device) and mounting hardware, can be set up and used to monitor any area as needed, e.g., a parking lot. Further, a network of devices 10 can be constructed in which the various devices 10 share data in a manner that permits a much wider area to be monitored with continuous awareness and tracking of objects across the fields of view of all of the devices 10. Still further, device 10 or a network of devices 10 can be used to secure a perimeter of a fixed installation, including a commercial or residential location, ensure security of other types of vehicles, such as trains, buses, cars, etc., and other similar applications.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A monitoring device comprising:
   an imaging device sensitive to visible and near-infrared electromagnetic radiation;
   means for concurrently directing omnidirectional visible and near-infrared electromagnetic radiation onto the imaging device without using any moving parts;
   a plurality of near-infrared illuminators, wherein each near-infrared illuminator is configured to emit near-infrared electromagnetic radiation in a unique region of the area around the monitoring device; and
   a processing component configured to operate the plurality of near-infrared illuminators in synchronization with an imaging frame rate of the imaging device, wherein only a subset of the plurality of near-infrared illuminators emit near-infrared electromagnetic radiation for a frame of image data captured by the imaging device and a unique subset of the plurality of near-infrared illuminators emit near-infrared electromagnetic radiation for two consecutive frames of image data captured by the imaging device.

2. The monitoring device of claim 1, wherein the means for concurrently directing comprises:
   a substantially transparent casing covering the imaging device; and
   an omnidirectional mirror attached to the casing, wherein the omnidirectional mirror is located in relation to the imaging device to direct the omnidirectional electromagnetic radiation onto the imaging device.

3. The monitoring device of claim 1, further comprising:
   a base, wherein the imaging device is attached to the base, wherein the processing component is disposed within the base, and wherein the processing component is further configured to process image data acquired by the imaging device and detect any targets present within an area around the monitoring device.

4. The monitoring device of claim 3, wherein the processing component is further configured to remove distortion from the image data acquired by the imaging device.

5. The monitoring device of claim 3, wherein the processing component is further configured to provide at least one of: the processed image data or an alert for processing by a monitoring system.

6. The monitoring device of claim 1, wherein the processing component sequentially activates the plurality of near-infrared illuminators and wherein the processing component assembles the image data sequentially captured for each of the plurality of near-infrared illuminators into a full panorama image of the area.

7. The monitoring device of claim 1, further comprising a plurality of acoustic sensors, each acoustic sensor configured to detect sound emanating from a unique region around the monitoring device.

8. The monitoring device of claim 1, further comprising a component configured to acquire an identification of a target object from a wireless identification device associated with the target object.

9. The monitoring device of claim 1, wherein the plurality of near-infrared illuminators includes at least eight near-infrared illuminators, and each of the plurality of near-infrared illuminators emits electromagnetic radiation having a beam angle of substantially equal to sixty degrees.

10. The monitoring device of claim 1, wherein the monitoring device has an average draw of substantially equal to three watts during operation.

11. A method of monitoring an area, the method comprising:
    concurrently directing omnidirectional visible and near-infrared electromagnetic radiation onto an imaging device sensitive to the visible and near-infrared electromagnetic radiation without using any moving parts;
    emitting near-infrared electromagnetic radiation from at least one of a plurality of near-infrared illuminators, wherein each near-infrared illuminator is configured to emit near-infrared electromagnetic radiation in a unique region of the area around the monitoring device, and wherein at least one of the plurality of near-infrared illuminators is off;
    capturing image data for the area concurrently with the emitting using the imaging device, wherein the emitting and capturing are repeated for each of a plurality of unique regions of the area around the monitoring device; and
    processing the image data to detect any target objects present within the area using at least one computing device.

12. The method of claim 11, wherein the processing includes removing distortion from the image data.

13. The method of claim 11, wherein the emitting uses one of the plurality of near-infrared illuminators.

14. The method of claim 11, wherein the processing includes assembling the image data captured for each of the plurality of capturing into a full panorama image of the area using the at least one computing device.

15. The method of claim 11, further comprising:
    detecting sound using a plurality of acoustic sensors; and
    processing the detected sound to evaluate a set of attributes of a source of the sound using the at least one computing device.

16. The method of claim 11, further comprising evaluating an alert condition using the at least one computing device based on one of: identification data received from the target object or a failure of the target object to provide identification data.

17. A monitoring system comprising:
    a monitoring device, the monitoring device including:
        an imaging device sensitive to visible and near-infrared electromagnetic radiation;
        means for concurrently directing omnidirectional visible and near-infrared electromagnetic radiation onto the imaging device without using any moving parts; and
        a plurality of near-infrared illuminators located around the imaging device, wherein each near-infrared illuminator is configured to emit near-infrared electromagnetic radiation in a unique region of the area around the monitoring device; and
    at least one computing device configured to individually operate each of the plurality of near-infrared illuminators and process image data acquired by the imaging device to detect any target objects present within the area, wherein the at least one computing device is further configured to operate the plurality of near-infrared illuminators in synchronization with an imaging frame rate of the imaging device, wherein only a subset of the plurality of near-infrared illuminators emit near-infrared electromagnetic radiation for a frame of image data captured by the imaging device and a unique subset of the plurality of near-infrared illuminators emit near-infrared electromagnetic radiation for two consecutive frames of image data captured by the imaging device.

18. The monitoring system of claim 17, wherein the monitoring device further includes a component configured to acquire an identification of a target object from a wireless identification device associated with the target object, and wherein the at least one computing device is further configured to evaluate an alert condition based on one of: identification data received from the target object or a failure of the target object to provide identification data.

19. The monitoring system of claim 17, wherein the monitoring device further includes a plurality of acoustic sensors located around the imaging device, and wherein the at least one computing device is further configured to evaluate a set of attributes of a source of a sound detected by at least one of the plurality of acoustic sensors.

20. The monitoring system of claim 17, further comprising a surveillance system configured to receive data from the monitoring device and present at least a portion of the data to a user.

* * * * *